United States Patent

Dorries

[15] 3,651,884
[45] Mar. 28, 1972

[54] OIL DRIP GUARD

[72] Inventor: Carl W. Dorries, 1308 Springlake Drive, Dallas, Tex. 75217

[22] Filed: Sept. 24, 1969

[21] Appl. No.: 860,608

[52] U.S. Cl. ..............................180/69.1, 184/106, 220/1 C, 296/38
[51] Int. Cl. ......................................................B62d 25/20
[58] Field of Search .................180/69.1; 184/106; 4/252 A; 296/38; 220/1 C, 42 A, 60 A, 60; 222/108; 62/291; 99/446; 431/119; 126/51; 123/198 E

[56] References Cited

UNITED STATES PATENTS 2,783,848  3/1957  Beskid..................................180/69.1
3,329,231  7/1967  Takenouchi..........................180/69.1
3,396,810  8/1968  Andrews...............................180/69.1
3,426,935  2/1969  Swett....................................220/42 A

*Primary Examiner*—Benjamin Hersh
*Assistant Examiner*—Milton L. Smith
*Attorney*—Kanz, Glaser & Harwood

[57] ABSTRACT

Disclosed is a pan for collecting oil drippage from motor vehicle engines and for protecting the underside of such engines from flying debris such as rocks and the like. The pan is adapted to be mounted under lateral stress and maintained in a state of compressional stress to prevent resonant vibrations.

5 Claims, 8 Drawing Figures

3,651,884

INVENTOR
CARL W. DORRIES

Kanz, Glaser & Harwood
ATTORNEYS

INVENTOR

CARL W. DORRIES

*Kanz, Glaser & Harwood*
ATTORNEYS

OIL DRIP GUARD

This invention relates to improvements in motor vehicles and more particularly to an oil drip pan or similar device for preventing oil, grease and the like from dripping from automobile engines, transmissions and the like.

The drip pan is also adapted to protect the underside of such automobiles from debris commonly encountered under certain driving conditions.

Internal combustion engines commonly used for powering motor vehicles generally employ a pan or sump on the underside of the engine for containing lubricating fluids such as oils, greases and the like. These oil pans or housings frequently leak allowing oil or grease to drip from the underside of the engine. Furthermore, pressures sometimes accumulate within the engine block itself forcing oil from an overflow pipe which is also allowed to drip from the underside of the automobile. Such oil and grease drippings create unsightly stains on driveways, streets and garages and, if allowed to form excessive accumulations, can cause potential fire hazards. Excessive accumulations of oil drippings can also result in dangerously slick floors in garages and the like. Frequently, motor fuel also drips from fuel pumps mounted on the engine block and compounds the problem.

Frequently the engine or transmission is damaged by flying rocks or other debris encountered on unimproved roads and the like.

Many attempts have been made to produce a successful drip pan to receive and collect drippings from motor vehicle engines and the like. However, in previous attempts the pans attached to the underside of an automobile engine were cumbersome to use and sometimes caused noisy vibrations when the vehicle was operated at high speeds. It is therefore an object of this invention to provide an oil drip pan or guard to receive and collect oil, grease, and the like which leaks from vehicular engines. Another object is to provide an oil drip pan or guard which is easily secured to the underside of an automobile engine and easily removed for repair, cleaning or other purposes. A further object is to provide an oil drip pan or guard which is essentially immune to vibration and which may be easily and quickly attached to most existing vehicle engines. Another object of the invention is to provide a device which eliminates oil from dripping onto driveways, garage floors and the like from motor vehicles and also protects the engine and transmission from flying rocks and debris. These and other objects, features and advantages of the invention will become more readily understood from the following detailed description taken in connection with the appended claims and attached drawings in which:

Figure 1:
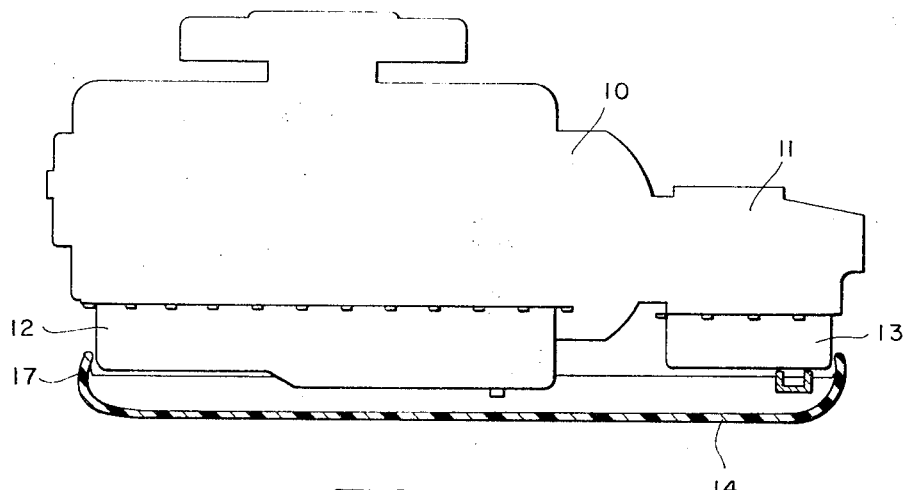
FIG. 1 is a sectional view of one embodiment of the invention shown attached to a standard automobile engine and transmission assembly.

Referring now to FIG. 1 there is illustrated a conventional automobile engine 10 and transmission 11. Conventional automobile engines include an oil pan generally indicated at 12 which contains the lubricating oils for lubricating the moving parts of the engine. Likewise transmission 11 has an oil pan 13 which contains lubricating fluids for reducing friction between the moving parts of the transmission 11.

Through general use, as well as pressures generated within the engine and transmission during operation, oils, greases and other lubricating fluids generally leak from such engine and transmission assemblies, particularly at junctions between the oil pan and the block of the engine or transmission housing. Furthermore, oil frequently is forced out overflow pipes and the like (not shown) which are provided in the engine and transmission assemblies to allow for the release of pressures built up within the apparatus.

Figure 2:
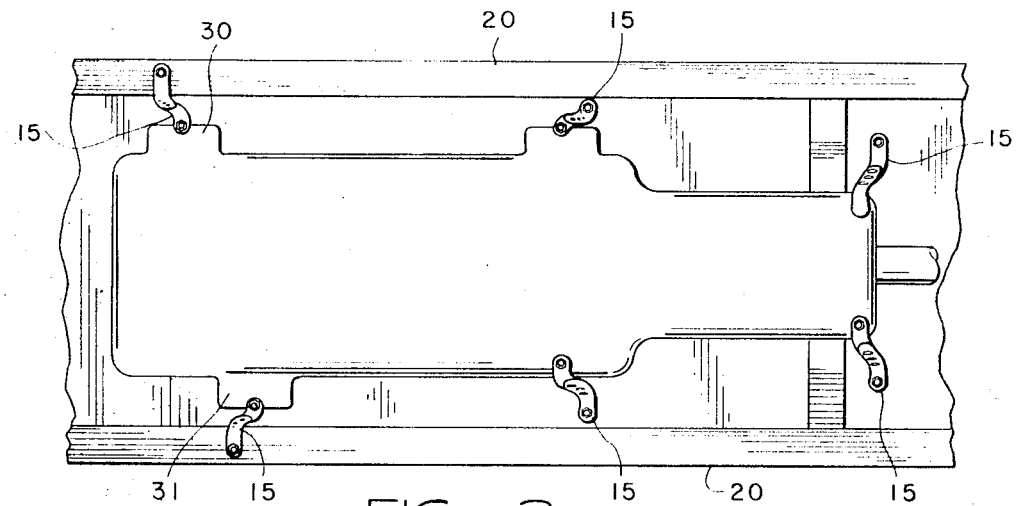
FIG. 2 is a bottom view of the oil drip pan of FIG. 1 illustrating the attachment thereto to the underside of an automobile engine and frame.

In accordance with the invention, an oil drip guard 14 is provided which is attached to the frame supporting the engine. The oil drip pan 14 is preferably of the general plan configuration of the underside of the engine-transmission assembly such as shown in FIG. 2 and is attached to the frame assembly by supporting brackets 15. As will be more clearly defined hereinafter with reference to FIGS. 4–6, the drip pan or guard 14 is fabricated such that when mounted in position on the motor vehicle the pan is maintained under internal compressional stress to maintain its shape and rigidity.

Figure 3:
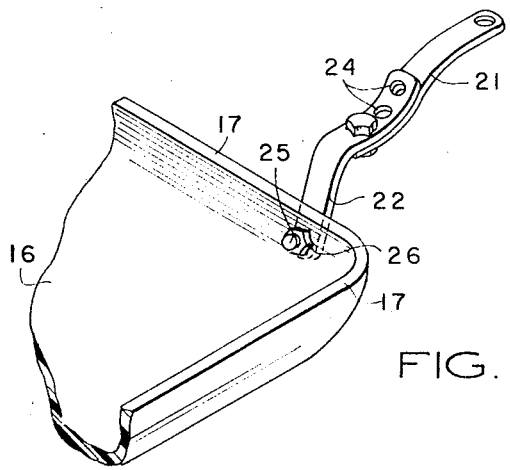
FIG. 3 is a fragmentary view of a portion of the oil drip pan of the invention illustrating the mounting means used for attaching such pans to the automobile.

When mounted in position on the motor vehicle the pan is maintained in a generally pan-shaped condition having a generally flat bottom section 16 and generally upwardly curving edges 17. A plurality of mounting brackets 15 are used to securely attach the pan 14 to the frame 20. As shown in detail in FIG. 3, mounting brackets 15 are preferably comprised of a pair of curved S-shaped pieces 21 and 22, each with a plurality of holes 24 therein. By providing each mounting bracket 21 and 22 with a plurality of holes 24, the mounting brackets may be adjustably extended to various lengths, thereby providing adjustable means for attaching the pan 14 to motor vehicles of different sizes. The bracket 15 is attached to the drip pan 14 by a bolt 25 passing through the edge 17 of the drip pan 14 and one hole in the end of mounting bracket 22. The bracket is secured to the pan 14 by a nut 26. The connection of bracket 15 to the pan 14 is then sealed with a sealing composition such as a polyethylene cap or a sealing washer between the nut 26 and pan 14. The opposite end of the mounting bracket is secured to the frame 20 by conventional mounting means such as a bolt, screw or the like.

It should be observed that mounting bracket 15 is generally S-shaped so that when bracket 15 is secured to both the drip pan 14 and the frame 20, tension is maintained on the drip pan through the S-shaped mounting bracket. Mounting bracket 15 is preferably fabricated of relatively soft iron, as distinguished from spring steel, so that the bracket may be used to mount the pan to the frame and maintain tension on the pan in its mounted condition.

It should be noted that the rearmost brackets 15 may be attached to the automobile flooring between the frame members 20. Therefore, relatively soft iron should be used for brackets 15. If the pan contacts a large rock or the like, brackets 15 will be bent without forcing them through the floor and damaging the automobile.

As shown in FIG. 2, the pan 14 is adapted to generally conform to the plan configuration of the underside of the engine and includes extensions 30 and 31 which project substantially outward from the body of the pan. Extensions 30 and 31 may be offset to avoid interference with the exhaust system yet provide means for receiving materials which drip from the fuel pump or other apparatus mounted on the sides of the engine block. Since the forwardmost brackets 15 are mounted on the extensions 30 and 31, additional leverage is obtained for flexing the pan to achieve compressional stress.

Figure 4:
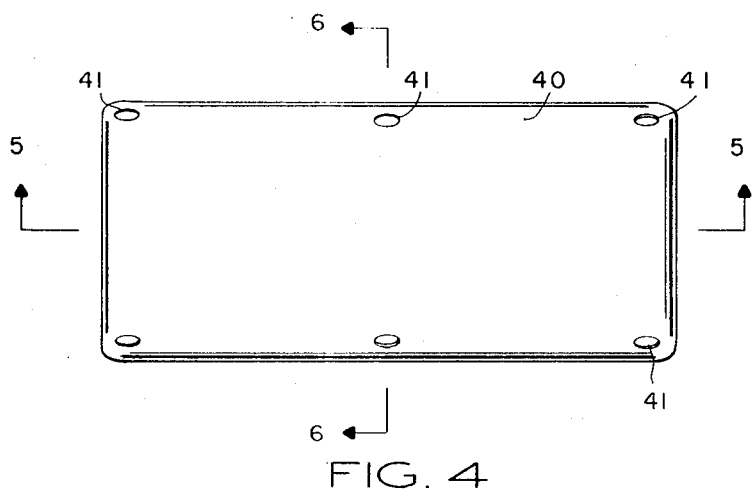
FIG. 4 is a plan view of another embodiment of the invention.
Figure 5A:
FIG. 5a is a sectional view of the device shown in FIG. 4 taken through the line 5—5 illustrating the general contour of the drip pan of the invention prior to attachment to the motor vehicle.

Referring now to FIG. 4, another embodiment of the invention is shown. The device illustrated in FIG. 4, is generally rectangularly shaped and is particularly designed for adaptation to rear engined automobiles. The pan 40 has a plurality of holes 41 therein for attaching mounting brackets such as those described with reference to FIG. 3.

Figure 5B:
FIG. 5b is a sectional view of the embodiment of the invention shown in FIG. 4 taken through the lines 5—5 illustrating the general contour of the device when attached to the motor vehicle.
Figure 6A:
FIG. 6a is a sectional view of the device of FIG. 4 taken through the lines 6—6 illustrating the general contour of the device prior to attachment to the motor vehicle.
Figure 6B:
FIG. 6b is a sectional view of the device of FIG. 4 taken through the lines 6—6 illustrating the general contour of the device when attached to the motor vehicle.

The oil drip pan of the invention is preferably formed of a unitary piece of resilient semi-rigid material such as fiber glass or the like and is preferably formed by casting or molding. In its relaxed condition (referring to FIGS. 5a and 6a) the pan is substantially curved. However, when attaching the pan to the motor vehicle substantial stress is induced into the drip pan so that it assumes a stretched position such as illustrated in FIGS. 5b and 6b. Since the pan 40 is formed of a unitary section of semi-rigid material, substantial internal compression is obtained by flexing the pan to the shape shown in FIGS. 5b and 6b. Since the pan is resilient, it will attempt to return to the original shape but is prevented from doing so by the mounting bracket. Thus the pan remains stressed while mounted. The internal compression and stress on the pan, when attached to the automobile, is essential to maintain the pan in a rigid condition thereby eliminating vibration and the like at high speeds or when excessive vibration is generated through operation of the automobile engine. It will be observed that through the internal compression exerted on the drip pan the entire assembly is continuously stressed, thereby eliminating any possibility of resonant vibrations being set up within the device.

An important feature of the invention is the formation of the drip pan in a curved structure which assumes a substantially pan-like condition when laterally stressed. By mounting the pan between the frame members 20 (as shown in FIG. 2) with the S-shaped brackets 15, the pan 14 may be maintained in a laterally stressed condition and thus maintain the pan-like condition. Due to the internal compressional stress generated by maintaining lateral stress on the device, the pan is substantially rigid and therefore immune to resonant vibration caused by either air currents or engine vibration.

The forward end of the pan 14 should have a substantial upwardly extending wall 17 which is mounted as near as possible to the engine block. By mounting the forward end near the engine block air is prevented from flowing between the engine and the drip pan 14.

It will be observed that the oil drip pan provided in accordance with this invention may be easily removed from the vehicle simply by removing the bolts securing the mounting brackets to the frame and/or floor, thus providing easy access to the underside of the engine or transmission for repairs and the like. Furthermore, the pan may be easily removed for cleaning or other servicing. It will also be observed that since the pan is located beneath the oil pan of the engine and transmission, any oil, grease or other fluids leaking from or otherwise expelled from the vehicle engine or transmission will be received and collected within the drip pan rather than being allowed to drip to the pavement beneath the automobile. Therefore all waste materials are collected and accumulated within the drip pan 14 which may be removed and cleaned as often as necessary. It will also be observed that due to the internal stress and compressional forces on the drip pan and the tension maintained on the drip pan by the mounting brackets, the drip pan is rigidly attached to the automobile frame. Dimensional stability of the pan is maintained by the internal stress and compressional forces so that slight changes in the configuration of the automobile, such as flexing and the like which occurs when the vehicle is in motion, keeps the pan from ever achieving a relaxed condition. Therefore the pan is substantially immune from any vibrational forces which would create a resonance within the drip pan or the mounting structure.

It will also be observed that since the drip collector 14 is positioned between the roadway and the automobile engine, the drip collector serves as a shield to prevent loose road materials and debris from striking the engine. Therefore, the drip pan of this invention serves not only to collect oil and the like, but to protect the engine and transmission from possible damage from loose road materials and debris.

While the invention has been described with particular reference to a drip pan for conventional automobile engines and the like, it will be readily apparent to those skilled in the art that the same principles may be used to adapt similar drip pans for any motor vehicle such as rear engine cars or front wheel drive vehicles where the engine, transmission and differential are all integrated into a single assembly or for trucks and other motor vehicles. It is to be understood that although the invention has been described with particular reference to specific embodiments thereof the form of the invention shown and described in detail is to be taken as a preferred embodiment of same and that various changes and modifications may be resorted to without departing from the spirit and scope of the invention.

What is claimed is:

1. A device for receiving and collecting fluid dripping from the underside of a motor vehicle comprising a unitary resilient semi-rigid pan having a substantially bowed bottom surface and upwardly projecting edges, said unitary pan being adapted to form a substantially flat bottom surface with upwardly projecting edges when lateral stress is applied to said upwardly projecting edges by mounting means connecting said pan to the underside of a motor vehicle.

2. The device set forth in claim 1 whereon the plan configuration of said device generally conforms to the plan configuration of the underside of an automobile engine and transmission assembly.

3. The device set forth in claim 1 and further including a plurality of substantially curved mounting brackets adapted to secure said pan to said motor vehicle and to maintain lateral stress on said pan when said pan is secured to said motor vehicle.

4. The device set forth in claim 3 wherein said mounting brackets are generally S-shaped members of adjustable length fabricated from relatively soft iron.

5. The device set forth in claim 1 and further including a plurality of extensions extending substantially outwardly from the body thereof and adapted for application of compressional stress to the bottom surface of said pan.

* * * * *